W. R. EDWARDS.
SIZING MACHINE.
APPLICATION FILED JUNE 30, 1919.
1,389,036.
Patented Aug. 30, 1921.
6 SHEETS—SHEET 4.
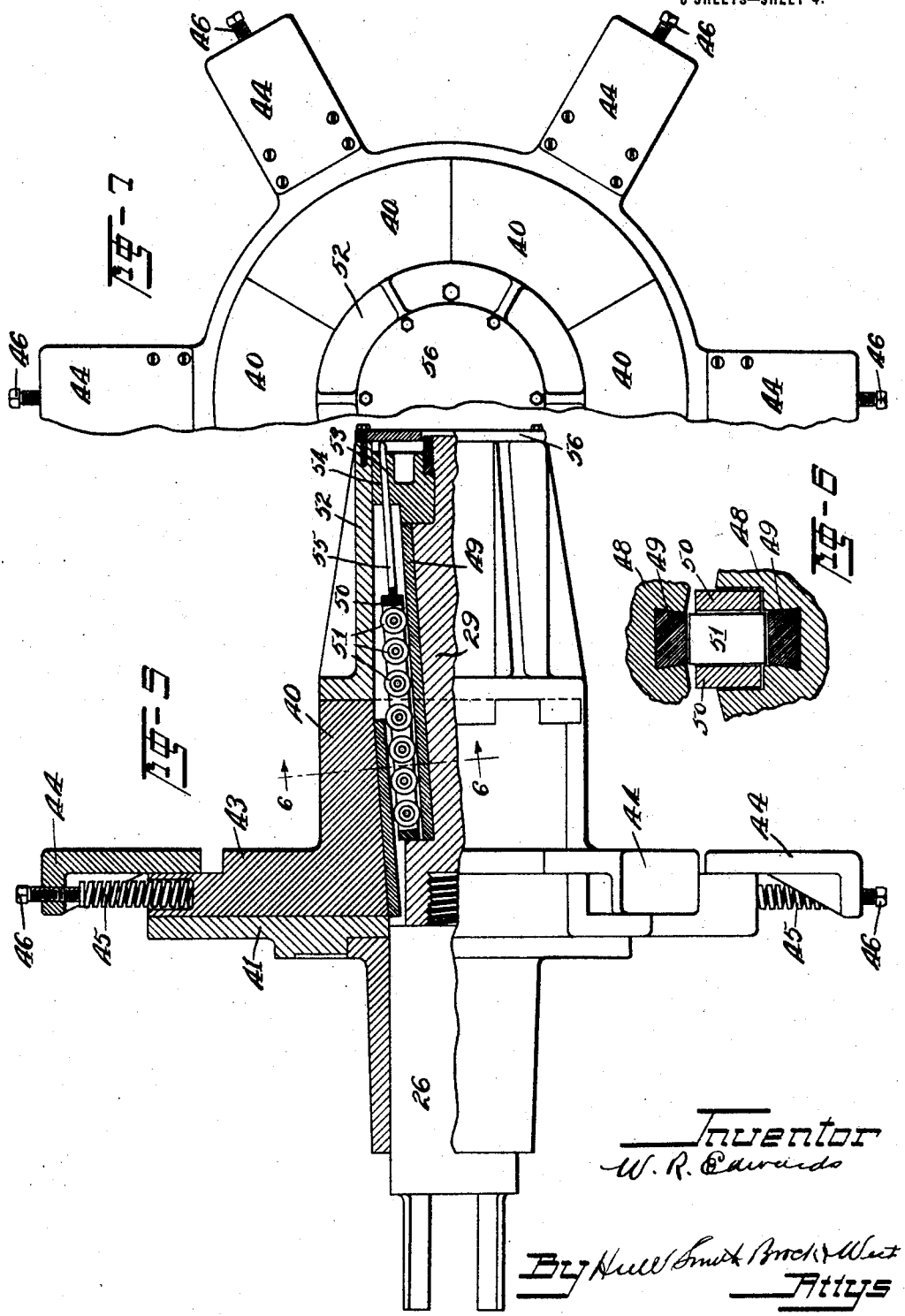
Inventor
W. R. Edwards
By Hull Smith Brock & West
Attys

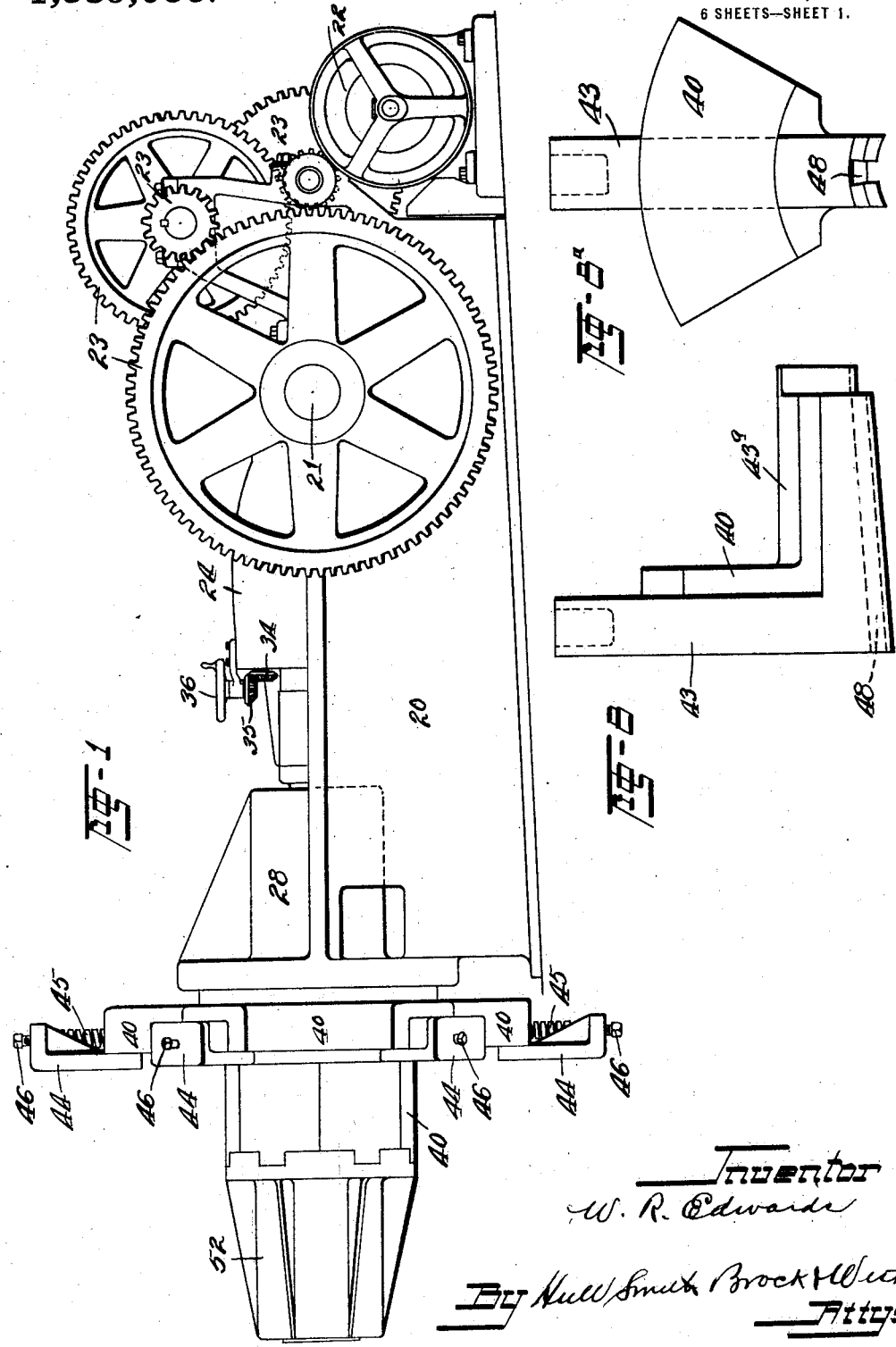

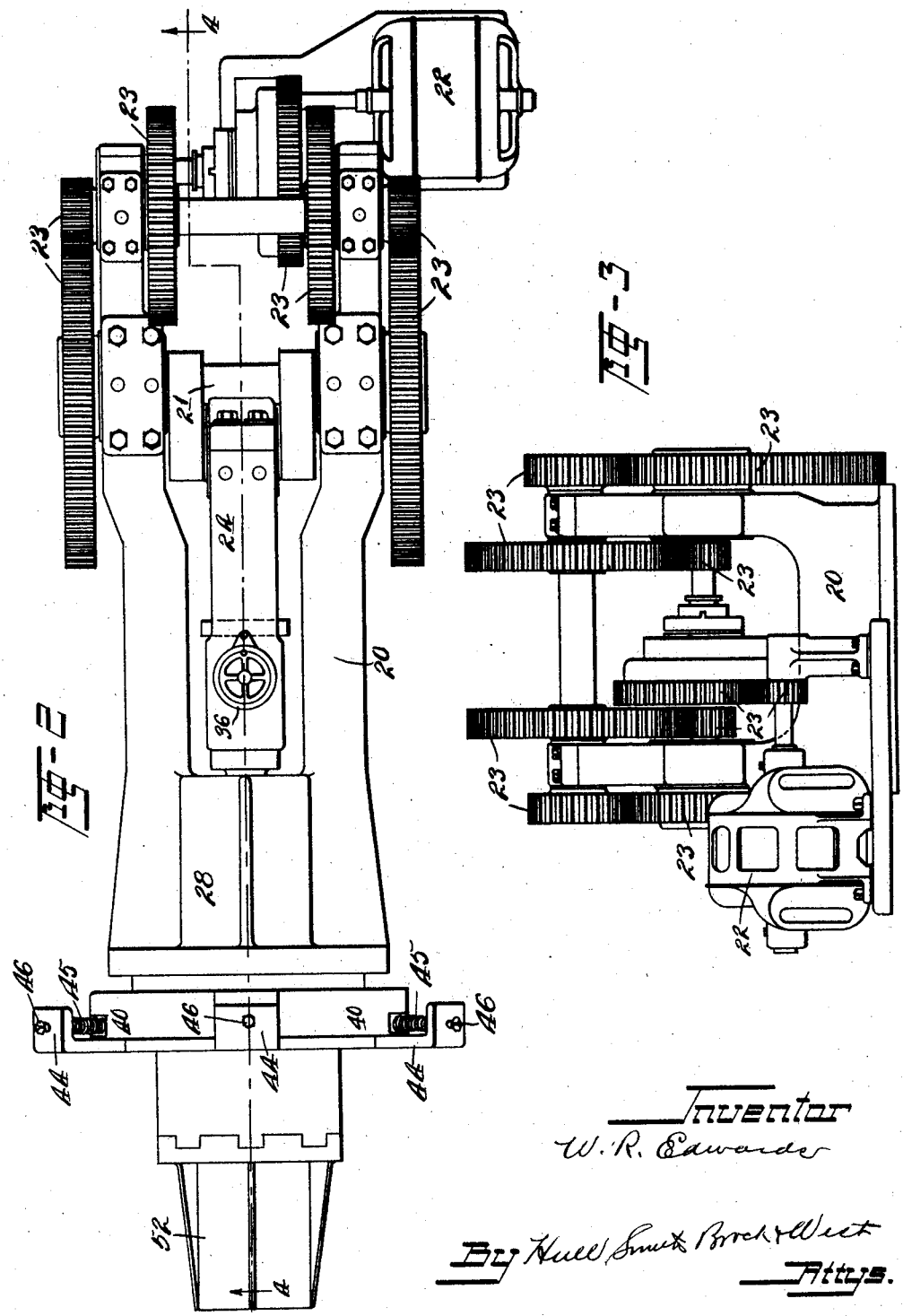

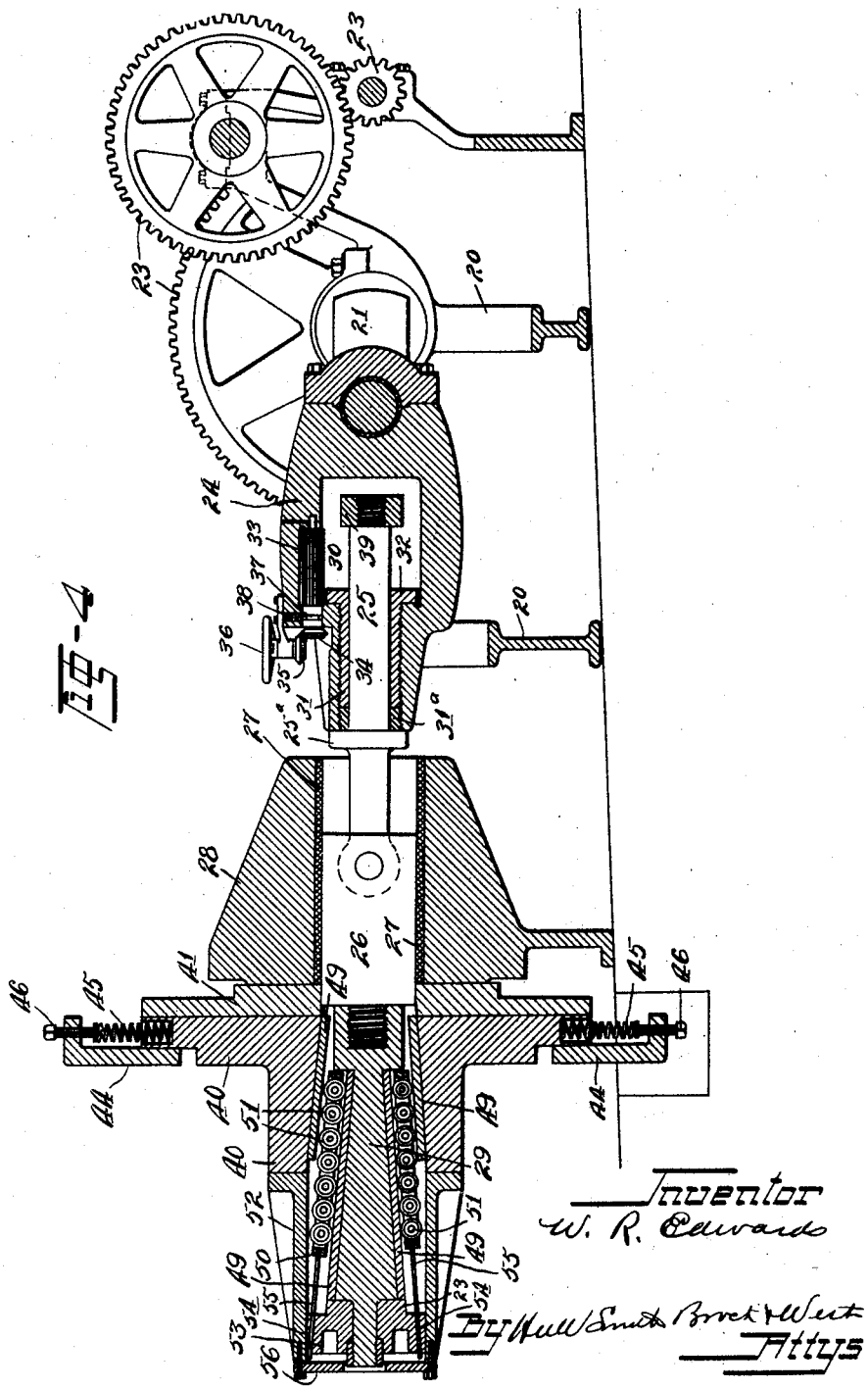

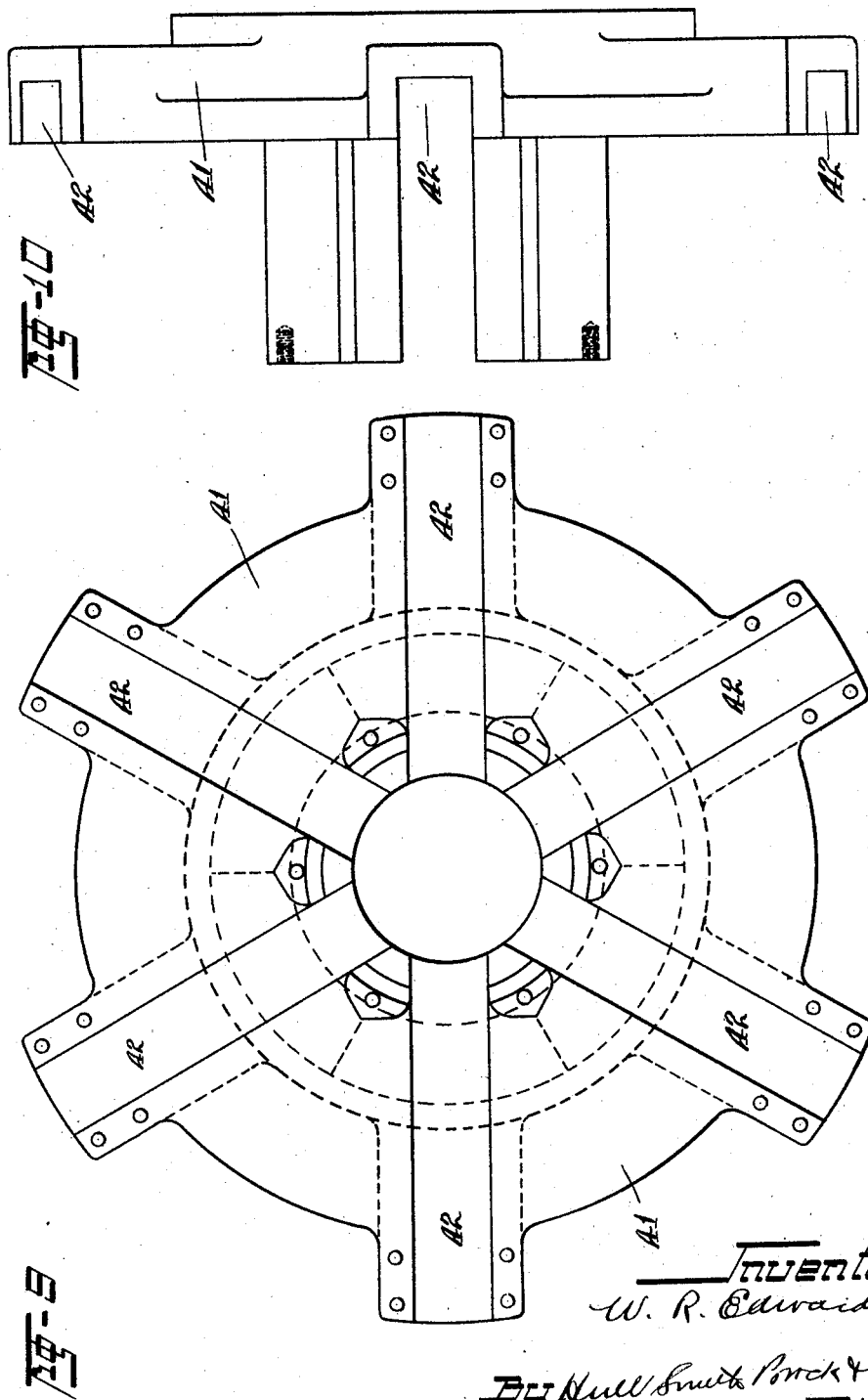

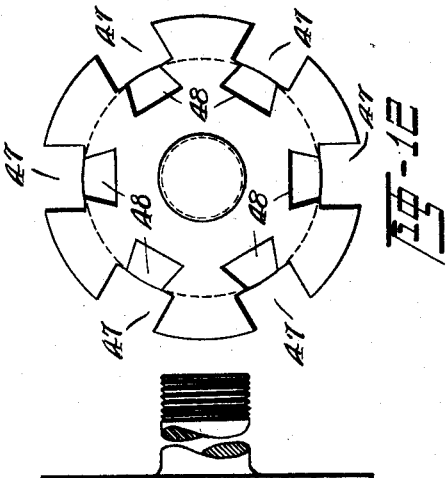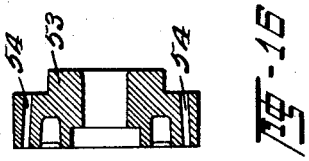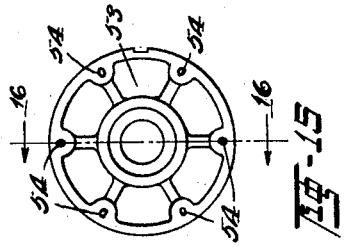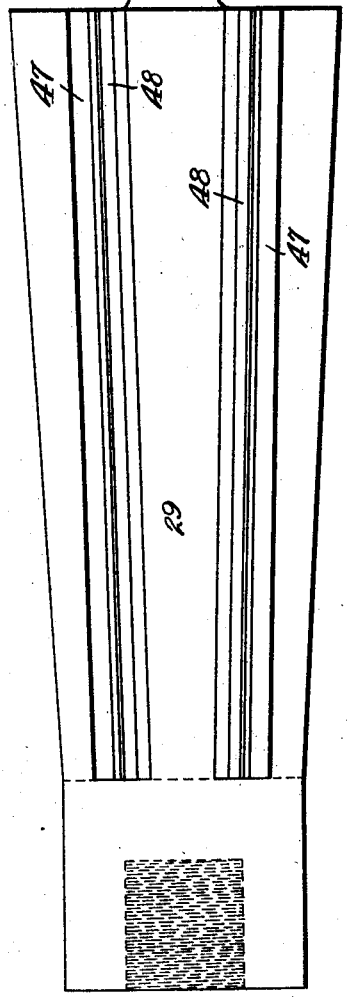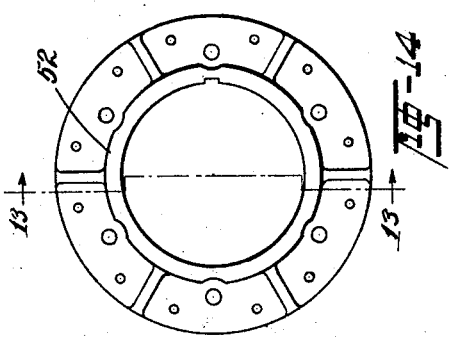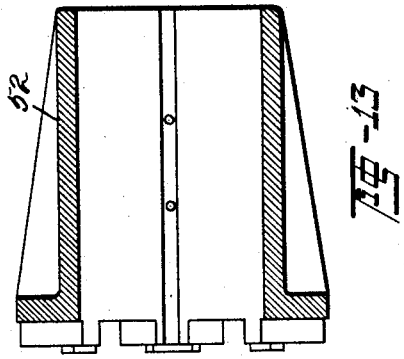

UNITED STATES PATENT OFFICE.

WILLIAM R. EDWARDS, OF CLEVELAND, OHIO, ASSIGNOR TO THE HYDRAULIC PRESSED STEEL COMPANY, OF CLEVELAND, OHIO, A CORPORATION OF OHIO.

SIZING-MACHINE.

1,389,036.  Specification of Letters Patent.  Patented Aug. 30, 1921.

Application filed June 30, 1919. Serial No. 307,531.

*To all whom it may concern:*

Be it known that I, WILLIAM R. EDWARDS, a citizen of the United States, residing at Cleveland, in the county of Cuyahoga and State of Ohio, have invented a certain new and useful Improvement in Sizing-Machines, of which the following is a full, clear, and exact description, reference being had to the accompanying drawings.

This invention is an improved machine for stretching and sizing bands or rims and though primarily designed for stretching and sizing tire carrying bands or rims it can be employed for performing these operations upon other types of bands or rims. The object of the invention is to provide a machine in which simplicity of operation and long use of the various parts are accomplished by reducing the friction to a minimum.

Another object of the invention is to so construct and arrange parts that great accuracy is obtained in the final sizing and stretching of the band or rim; and a still further object is to provide for the adjustment of the parts so that the same machine can be employed for sizing and shaping bands or rims of different sizes. With these various objects in view, and certain others which will become apparent as the description proceeds, the invention consists in the novel features of construction and combination of parts hereinafter fully described and pointed out in the claims.

In the drawings forming a part of this specification Figure 1 is a side elevation of a machine constructed in accordance with my invention; Fig. 2 is a top plan view of the same; Fig. 3 is a rear end view of the machine; Fig. 4 is a vertical sectional view on the line 4—4 of Fig. 2; Fig. 5 is an enlarged view partly in section and partly in elevation of the expander; Fig. 6 is a detail section on the line 6—6 of Fig. 5; Fig. 7 is a partial front elevation of the expander; Fig. 8 is a side view of one segment and Fig. 8ᵃ a face view of same; Fig. 9 is a front elevation of the casting carrying the expanding sections; Fig. 10 is a side elevation of the same; Fig. 11 is an elevation of the movable wedge; Fig. 12 is an end view of the same; Fig. 13 is a sectional view of the front guide casting taken on the line 13—13 of Fig. 14; Fig. 14 is a front view of said casting; Fig. 15 is an end view of a guide casting adapted to be arranged from the end of the movable wedge; and Fig. 16 is a sectional view on the line 16—16 of Fig. 15.

In constructing a machine in accordance with my invention I employ a suitable bed or frame 20 in which is mounted a crank shaft 21 which is driven from an electric motor 22 through the medium of a suitable train of gears 23 and this train of gears may be provided with any suitable form of clutch by means of which the machine can be thrown into or out of operation when desired. Connected to the crank shaft and operated thereby is a pitman which is of special construction comprising a yoke frame 24 in which slides the connecting rod 25 which in turn is connected to the plunger connecting rod 26 which slides in bearings 27 placed in the front casting 28 constituting a part of the frame, and connected to the member 26 is the expanding plunger 29, these parts being of special construction as hereinafter set forth. The yoke 24 is bored and threaded longitudinally from the forward end to the central open portion 30, and fitting in this threaded end of the yoke is a threaded sleeve 31 having a flange 32 at the inner end thereof, the periphery of this flange having teeth cut therein adapted to mesh with an elongated pinion 33 journaled in a recess in the upper portion of the yoke, the shaft of this pinion carrying a bevel gear 34 at its forward end which meshes to a similar gear 35 carried upon the lower end of the shaft having a hand wheel 36 at its upper end. The shaft of the pinion 33 has a groove 37 cut therein and a set screw 38 holds this pinion against longitudinal movement but permits free rotation thereof from the hand wheel. By means of this hand wheel and the parts operated therefrom, it is possible to adjust the sleeve 31 back and forth in order to obtain the proper amount of expansion from the wedge shaped plunger.

A head nut 39 is rigidly connected to the rear end of the connecting rod 25 and as the yoke is carried rearwardly by the crank shaft the flange head or end of the sleeve 31 will contact with the head 39 and slide the rod 25 and the member 26 rearwardly carrying with it the expanding plunger 29, and it is obvious that by adjusting the sleeve 31 the exact amount of expansion can be determined. The rod 25 is formed with a stop shoulder 25ª which contacts with the forward end of the yoke 24, and a bushing or ring 31ª is inserted in the forward end of the yoke and against which the adjustable sleeve will contact when said sleeve is in its foremost position, and this bushing maintains the proper guide for the rod 25 at all times irrespective of the adjustment of the sleeve 31. The expanding of the rim or band is accomplished by separating or moving apart a plurality of chuck segments 40, preferably six in number, and mounted in a chuck body 41 connected to the front casting 28. This chuck body 41 is formed with radiating guideways 42 in which work the vertical members 43 of the chuck segments and connected to the chuck body are a series of brackets 44 there being one for each guide 42, this bracket serving to hold the vertical member of the chuck in place and also provide for the positioning of the coil spring 45 against which the chuck segment works, the inner end of the spring being located in a recess formed in the outer end of the member 43 while the upper end thereof is adapted to contact with the inner end of a screw 46 passed through the bracket 44, the end of the screw being provided with a suitable enlargement to bear upon the end of the spring. As the expanding plunger 29 moves rearwardly the chuck segments will be forced outwardly and the band or rim resting upon the horizontal members 43ª will be stretched and shaped and given the proper size and contour, and as the greatest wear in a device of this kind occurs at the points where the expanding member and the chuck segments coöperate it is of the utmost importance that the wear at these points should be reduced to a minimum in order to avoid frequent adjustment of parts to maintain accuracy, and also to add materially to the useful life of the machine, and it is with the idea of accomplishing these results that I have provided the novel form of anti-friction device and wearing appliances between the expanding member and the chuck segments, and by reference to Figs. 11 and 12 it will be noted that I construct the expanding plunger 29 with six longitudinal recesses 47 and that in the bottom of each longitudinal recess 47 is cut a dove tailed groove 48, this groove being adapted to receive a hardened strip of metal 49 which is machined to fit accurately into the groove 48 and is hardened to eliminate wear. In each longitudinal recess 47 is arranged a cage 50 in which are mounted hardened rollers 51, the cage being of such size as to slide back and forth in the longitudinal recess while permitting the hardened rollers 51 to travel upon the hardened strips 49 located in the grooves 48, and in the adjacent face of each horizontal member 43ª there is cut a similar groove 48 in which is mounted a similar hardened strip 49 against which the hardened rollers 51 bear during the sliding movement of the expanding plunger 29, it being readily seen that as said plunger moves rearwardly the cage and rollers will be carried rearwardly also a certain distance, but contacting with the hardened strip arranged in the inclined portions of the chuck segments, the continued movement of the expanding plunger will be continued and there will be a rolling contact between the expanding plunger and the chuck segments, the cage and roller moving only a slight distance during the expanding operation, and upon the reverse movement the same advantageous operations will occur, that is, there will be a rolling contact between the plunger and expanding section and a very slight movement of the cage and roller. As the plunger moves forwardly the springs 45 will return the chuck segments to their normal or contracted position. At the forward end of the chuck body there is connected a guide casting 52 in which moves the forward end of the plunger, said plunger having a head 53 rigidly connected thereto, said head fitting snugly and sliding freely in the guide 52. This head is provided with guide openings 54 through which pass the rods 55 extending rearwardly from the cages 50 carrying the rollers 51, said rods thus positioned serving to maintain the cages and rollers in their proper positions at all times. The forward end of the guide 52 is closed by means of the plate 56.

Having thus described my invention, what I claim is:—

1. In a machine of the kind described, the combination with an expanding member, of a plurality of chuck segments and longitudinally movable anti friction devices interposed between said expanding member and the chuck segments.

2. In a machine of the kind described, the combination with an expanding member, of a plurality of chuck segments, and anti friction devices interposed between said expanding member and said chuck segments and movable longitudinally with reference to said expanding member and chuck segments.

3. In a machine of the kind described, the combination with an expanding member, of a plurality of chuck segments, and longitudinally movable cages carrying anti friction rollers, interposed between said expanding member and segments.

4. In a machine of the kind described, the combination with an expanding member, of a plurality of chuck segments, longitudinally movable cages carrying anti friction rollers interposed between said expanding member and segments, together with means for guiding said cages.

5. In a machine of the kind described, the combination with an expanding member, longitudinally grooved recesses, of a plurality of chuck segments each having a longitudinal groove, hardened strips located in said grooves, a cage movable in each longitudinal recess in the expanding member, said cages having anti friction rollers adapted to contact with the hardened strips.

6. In a machine of the kind described, the combination with an expanding member, of a chuck body having guides and brackets, a plurality of chuck segments, a plurality of springs interposed between the segments and guides, together with longitudinally movable anti friction devices interposed between the expanding member and the chuck segments.

7. In a machine of the kind described, the combination with an expanding member, of a plurality of chuck segments, a chuck body in which the segments are guided, a guide casting connected with the chuck body, a member sliding therein and connected with the expanding member, a connecting rod united to said sliding member, a yoke connected with said rod, said yoke being connected to a crank shaft, together with means for adjusting the point of contact between the yoke and connecting rod.

8. In a machine of the kind described, the combination with a crank shaft, of a yoke connected thereto an adjustable sleeve carried by said yoke together with means for adjusting the same, a rod working through said sleeve and having a head adapted to contact with the end of the sleeve, a sliding member connected to said rod, an expanding member connected to said sliding member, a plurality of chuck segments together with means for guiding said chuck segments and means for guiding the sliding member.

9. In a machine of the kind described, the combination with a plurality of chuck segments and means for guiding the same, of an expanding member, a sliding member to which the expanding member is connected, together with means for guiding the same, a crank shaft, a yoke connected thereto, a sleeve threaded in the forward end of said yoke, the rear end of said sleeve being flanged and toothed, a pinion carried by said yoke and engaging said toothed end of the sleeve, hand operated means for turning said pinion, and a rod working through said sleeve the forward end of said rod being connected to the sliding member, and a head mounted upon the rear end of said rod.

10. In a machine of the kind described, a plurality of radially movable chuck segments, a reciprocating member having a conical chuck engaging portion and centering bearings for the reciprocating member engaging the same on both sides of the chuck segments.

11. In a machine of the kind described, a plurality of radially movable chuck segments, front and rear guides for the chuck segments, central bearings carried by the guides, and a reciprocating member having a conical segment engaging portion and extensions at opposite ends of the conical portion fitting in said bearings.

12. In a machine of the kind described, a plurality of radially movable chuck segments, a tapered reciprocating member, means for maintaining the reciprocating member centrally disposed with reference to the chuck segments, and longitudinally movable anti-friction devices engaging said reciprocating member, and chuck segments.

In testimony whereof, I hereunto affix my signature.

WILLIAM R. EDWARDS.